G. H. HARKRADER.
ROTARY BAKING OVEN.
APPLICATION FILED OCT. 24, 1919.

1,388,256.

Patented Aug. 23, 1921.

George H. Harkrader
INVENTOR.

BY
Edwin T. Corbett
ATTORNEY.

UNITED STATES PATENT OFFICE.

GEORGE H. HARKRADER, OF COLUMBUS, OHIO, ASSIGNOR TO THE NEW SYSTEM MANUFACTURING COMPANY, OF COLUMBUS, OHIO, A CORPORATION OF OHIO.

ROTARY BAKING-OVEN.

1,388,256.  Specification of Letters Patent.  Patented Aug. 23, 1921.

Application filed October 24, 1919. Serial No. 332,981.

*To all whom it may concern:*

Be it known that I, GEORGE H. HARKRADER, a citizen of the United States of America, residing at Columbus, in the county of Franklin and State of Ohio, have invented certain new and useful Improvements in Rotary Baking-Ovens, of which the following is a specification.

My invention relates to rotary baking ovens and has particular reference to that class of baking ovens comprising a practically cylindrical casing within which is used a reel embodying a rotatable ring carrying suspended seats or shelves for the reception of the material to be baked. In this form of oven, the heating medium is generally introduced at the bottom of the casing, this casing being mounted upon legs.

A particular object of my invention is to provide a door for this type of oven which is located below or substantially below the horizontal center of the casing with the result that whenever the door is opened for the putting in or the taking out of bread or other material to be baked, a majority of the heat which is always found at the top of the casing will be retained. Thus, the baker may open his door for inspection from time to time or even for the removal of baked material and the placing of other material in the oven for baking without seriously dissipating the heat within the casing of the oven. In this manner, the efficiency of ovens of this type will be largely increased and the successive baking operations will be shortened.

Another important object of my invention consists in the provision of a novel type of hinge whereby, in spite of the fact that the door used by me is located in the under-cut side of the oven, this door will nevertheless remain closed when once closed without the necessity of latching or locking. I attain this result by what may be termed an over-center hinge at the lower edge of the door.

A still further important object of my invention arises from the fact that I have provided a glass or other transparent medium in the end wall of the casing of my oven and have located this transparent medium below or substantially below the horizontal center of the oven. In this way, it is very largely free from the steaming and clouding effect of the gases which naturally gather in the top of the casing. It is important to maintain this glass clear not only for the benefit of the baker and his assistants but also for the advertising effect upon the public, to whom the view of the revolving reel containing the baking material has been found to be attractive.

The preferred embodiment of my invention is shown in the accompanying drawings wherein similar characters of reference designate corresponding parts and wherein—

Figure 2:
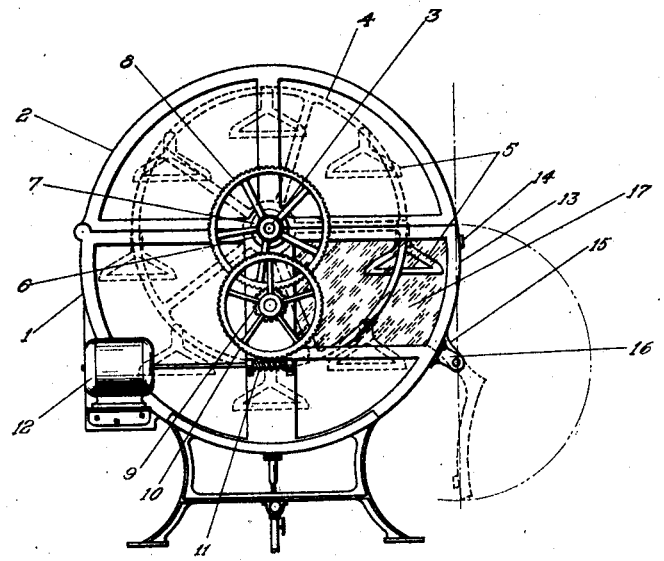
Fig. 2 is an end elevation of my oven showing the door represented in lowered position by dotted lines.
Figure 1:
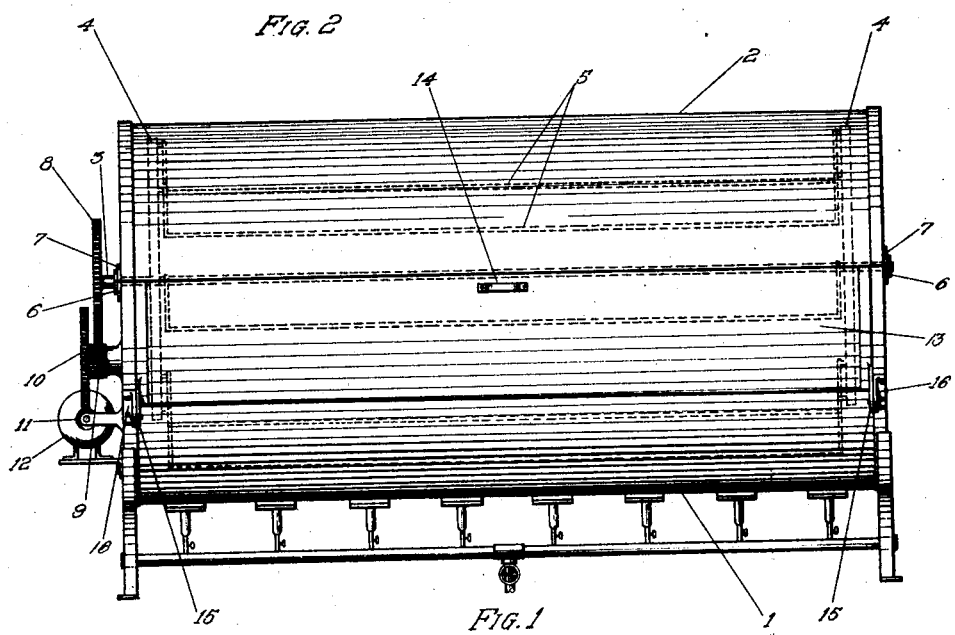
Figure 1 is a front elevation of my oven.

In the drawings, my oven is shown as comprising a casing formed in two parts 1 and 2. The part 2 is of considerably less depth than the part 1 and is superimposed upon the part 1, being held thereon in any desired manner. Preferably, these parts are bolted together so that they may not be readily shifted with relation to each other since, when once the oven is assembled, the interior of the oven should only be accessible through the door to be described.

Journaled within the casing upon a shaft 3 is a ring 4 carrying gravity-suspended shelves 5 at intervals thereon. This shaft 3 desirably rests in sockets 6 upon the upper edges of the member 1, the other halves of the bearing being formed by sockets 7 in the member 2. Upon the end of the shaft 3 I have provided a gear 8 for coöperation with a broad-faced pinion 9 upon whose outer surface is mounted a worm gear 10 coöperating with a worm 11 driven by a motor 12.

The door of my invention is mounted in the front side of the cylindrical casing as at 13. It desirably extends throughout the length of the oven, being provided with a handle 14. At is lower corners, it is provided with hinge members 15 which are complemental to hinge members 16 upon the casing proper. It will be noted that these hinges are elongated so that they constitute an over-center hinge with the result that when the door is swung upward and into closed position, it will remain in this closed position because of the extended nature of the hinge. Likewise, when the door is swung to open position, it must be positively lifted back to closed position.

Mounted within one end of the casing, I have provided a glass plate 17, although any other transparent material would suffice. I have mounted the glass plate in the lower section of the casing. In this manner, this glass plate will be largely removed from subjection to the intense heat within the top of the casing.

It will be apparent that I have provided certain improved features, whose importance will be apparent. In the use of the door shown by me, it is rarely necessary for the baker to open the door fully. Usually, he merely opens it to a very slight degree. When he is ready to close it, he does not have to bother with a locking or latching means which is always difficult of operation under the temperature changes that are bound to occur around a device of this type. The advantages of the novel location of the glass plate for inspection will also be apparent from what has already been said.

Having thus described my invention, what I claim is:

1. A rotary baking oven comprising a cylindrical casing, a reel operating in said casing, said casing having an undercut side, a door in said undercut side, and over-center hinges upon which said door is mounted at its lower edge.

2. A rotary baking oven comprising a cylindrical casing, a reel operating in said casing, a door in the cylindrical side wall of said casing and mainly below the horizontal center thereof, and hinges at the lower edge of said door of such form that the door when once closed will remain closed despite the undercut contour of the cylindrical side wall.

3. A rotary baking oven comprising a cylindrical casing, a reel operating in said casing, a door in the undercut part of the cylindrical casing and mainly below the horizontal center thereof, so that when the door is opened only a small amount of heat will escape through the door opening, hinges at the lower end of said door and on the casing projecting outwardly from the casing to such extent that when the door is closed it will lie of its own accord at one side of a vertical plane passing through the centers of the pivots of the hinges and when the door is open it will lie of its own accord at the other side of said plane.

In testimony whereof I hereby affix my signature.

GEORGE H. HARKRADER.